US007081724B2

(12) United States Patent
Bouix et al.

(10) Patent No.: US 7,081,724 B2

(45) Date of Patent: Jul. 25, 2006

(54) ELECTRICAL ACTUATOR HAVING A DIRECT CURRENT MOTOR

(75) Inventors: Marc Bouix, Taninges (FR); Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/530,251

(22) PCT Filed: Sep. 29, 2003

(86) PCT No.: PCT/IB03/04292

§ 371 (c)(1), (2), (4) Date: Apr. 5, 2005

(87) PCT Pub. No.: WO2004/034551

PCT Pub. Date: Apr. 22, 2004

(65) Prior Publication Data

US 2006/0012319 A1 Jan. 19, 2006

(30) Foreign Application Priority Data

Oct. 10, 2002 (FR) .................................. 02 12618

(51) Int. Cl.
*H04Q 7/00* (2006.01)
*H04Q 9/00* (2006.01)

(52) U.S. Cl. ........................ 318/16; 318/466; 318/468; 318/480

(58) Field of Classification Search .................. 318/16, 318/466, 468, 266, 280–286, 480
See application file for complete search history.

(56) References Cited

U.S. PATENT DOCUMENTS 4,492,908 A * 1/1985 Stockle et al. .............. 318/663
4,686,614 A * 8/1987 Costello ...................... 363/17
4,808,995 A * 2/1989 Clark et al. ................ 340/5.64
4,995,442 A * 2/1991 Marzec ....................... 160/331
5,065,078 A * 11/1991 Nao et al. ..................... 318/16
5,170,108 A * 12/1992 Peterson et al. ............ 318/469
5,552,769 A * 9/1996 Riordan ...................... 340/550
6,181,095 B1 * 1/2001 Telmet ....................... 318/480
6,388,412 B1 * 5/2002 Reed et al. ................. 318/466
6,737,823 B1 * 5/2004 Reed et al. ................. 318/466
6,812,662 B1 * 11/2004 Walker ....................... 318/280
6,850,017 B1 * 2/2005 Domel et al. ............... 318/138

* cited by examiner

*Primary Examiner*—Rina Duda
*Assistant Examiner*—Tyrone Smith
(74) *Attorney, Agent, or Firm*—Welsh & Katz

(57) ABSTRACT

An electrical mains-powered actuator designed to operate a closing, darkening or solar protection element, having in a common enclosure, a direct current motor, a board controlling the motor power supply and an AC/DC voltage converter, the control board including a radio-wave receiver, such that the voltage converter enables lowering of the voltage and includes at least one switch controlled at a frequency (F1) such that it is at most equal to twice the mains sector frequency or such that its ratio to the radio-wave receiver frequency (F0) ranges between 2.2 $10^{-5}$ to 2.2 $10^{-4}$.

8 Claims, 1 Drawing Sheet

Fig. 1
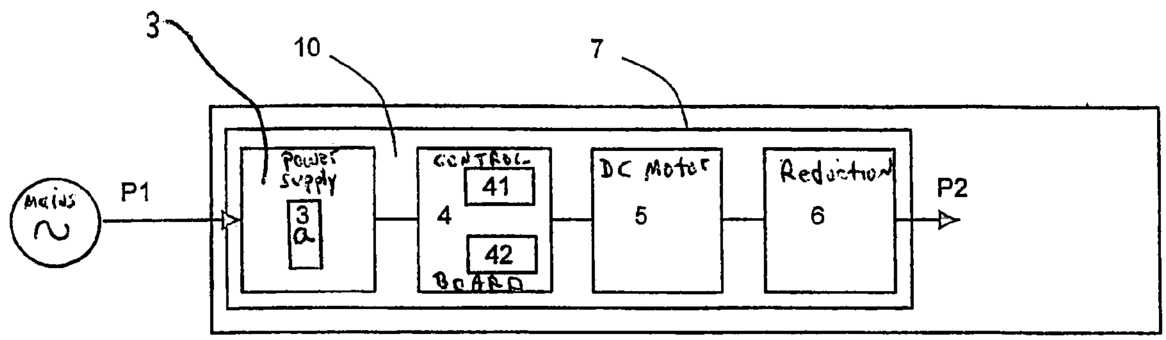
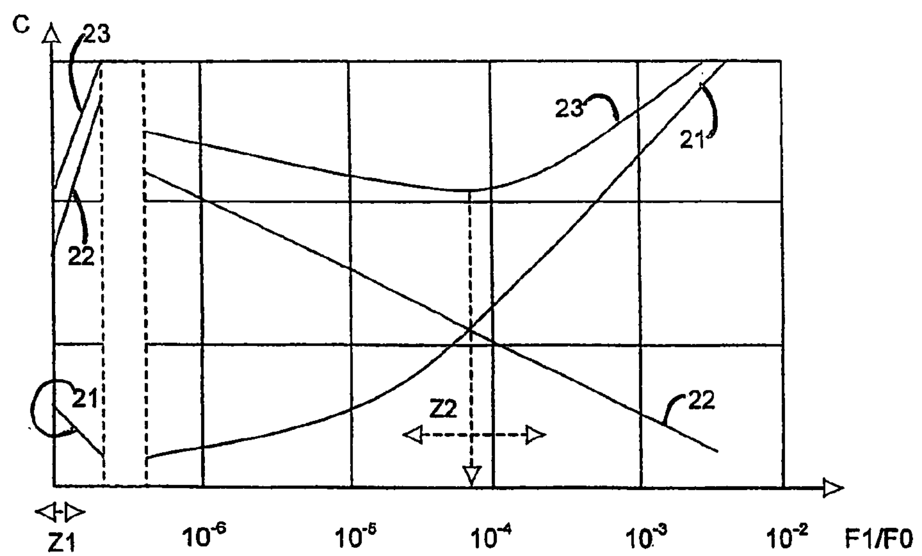
Fig. 2

ELECTRICAL ACTUATOR HAVING A DIRECT CURRENT MOTOR

CROSS-REFERENCE TO RELATED APPLICATIONS

This is a 371 national phase application of PC1/IB03/04292 filled Sep. 9, 2003, claiming priority to French Patent Application No. 0212618 filed Oct. 10, 2002, the contents of which are incorporated herein by reference.

FIELD OF THE INVENTION

The invention relates to an electrical mains-powered actuator designed to operate a closing, darkening or solar protection element.

BACKGROUND

These actuators are often contained in a cylindrical enclosure when they control the movement of roller blinds and in a parallelepipedal enclosure when they control the movement of venetian blinds.

Apart from very specific applications requiring an independent accumulator battery and/or solar panel type power supply, these actuators are powered from the low voltage (LV) AC mains supply (electric power grid, 110 to 230 V, 50 or 60 Hz, depending on countries) and the electric motors used in these actuators are normally of single-phase asynchronous type (induction motor) with permanent capacitor.

However, it is proving advantageous to replace such alternating current motors with permanent magnet DC motors, designed to operate at an extra low voltage (ELV), that is, more often than not, less than 48 V. Such motors are produced in very large quantities, in particular for automobile applications, and their cost is therefore low.

Furthermore, the DC motor is well known to offer wide flexibility of use. In practice, the rotation speed can be controlled by the rotor power supply voltage and obstacles can be detected by analyzing the rotor current which reflects the motor torque.

However, converting a low voltage AC electrical source into an extra low voltage DC source raises problems. Indeed, the dimensions of the components required lead to a physical separation between the power supply converter and the actuator. This separation is not practical: it means having to arrange a second location to accommodate the power supply module and, above all, having to provide a large section cable connecting line to power the DC motor. This connecting line also presents the drawback of radiating interference generated by the electrical switching action of the motor commutator.

Patent FR 2 692 418 discloses a solution to this type of problem. It proposes, like other documents of the state of the art, that each venetian blind casing should simultaneously house the extra low voltage DC motor, a battery and a converter device formed by a transformer and a rectifier (FIG. 3 of this patent). The battery is used to store energy. Because of this, the converter device is simply dimensioned for slow recharging of the battery, which means that its dimensions can be reduced. There is nothing in this embodiment to suggest grouping all of these elements in the actuator: they are clearly represented physically separate within the casing. However, for issues of battery life and maintenance, it makes sense to allow for its easy replacement.

Such a solution presents an obvious drawback: it limits the number of operations to the battery capacity, which can be recharged only slowly.

Patent application EP 0 852 281 discloses a tubular actuator comprising a reduction gear, a DC motor and an electronic control board also serving as mains powered power supply. It states that this board can in effect be used to replace the transformer, the size of which is incompatible with installation in the tube. The solution recommended in this document consists in replacing such elements with a power electronic unit comprising a coil mounted on a ferrite core, a diode, a rectifier bridge and a capacitor.

It also states that the remote control of the actuator can be achieved by known means such as an infra-red link or a radio-wave link.

The problem raised by this arrangement lies in the miniaturization constraints evoked in the prior art, but also in the cohabitation relationships between the various elements. In practice, the latter dissipate and receive thermal energy, although their own performance characteristics are affected by temperature, send and receive electromagnetic interference, although the performance of one of them is directly affected by the electromagnetic field and, finally, send and receive conducted interference on their power supply line.

Patent application EP 1 091 078 discloses a motorized blind device in which the motor is of low voltage type and is powered from the mains supply via a low voltage AC/DC converter. The use of a low voltage motor raises certain problems. In practice, these motors are difficult to produce and are expensive. In the proposed embodiment, the operation of the converter runs the risk of disturbing the command receiver located nearby.

Also, in a quite different field, patent U.S. Pat. No. 5,818,703 discloses a voltage step-up DC/DC converter intended to power a cardiac defibrillator, the switch of which operates at high frequency.

The object of the invention is to improve the actuators of the prior art and resolve the abovementioned problems. In particular, the invention proposes to combine within a given space, a DC motor, a motor power supply control board and a voltage converter, the control board comprising a radio-wave receiver. The operation of such an actuator must also be reliable.

SUMMARY OF THE INVENTION

The electrical mains-powered actuator is designed to operate a closing, darkening or solar protection element. It includes, in a common enclosure, a direct current motor, a board controlling the motor power supply and an AC/DC voltage converter. The control board includes a radio-wave receiver. The voltage converter enables lowering of the voltage and includes at least one switch controlled at a frequency such that it is at most equal to twice the mains sector frequency or such that its ratio to the radio-wave receiver frequency ranges between $2.2\ 10^{-5}$ to $2.2\ 10^{-4}$.

Starting from the prior art requiring no electrical energy storage battery, it has been observed in the context of the work leading to the present invention that miniaturizing a converter having sufficient power to simultaneously power a radio-wave receiver, logical control elements and, primarily, the DC electric motor, requires the presence of at least one controlled switch, with a predefined frequency, this element being essential for obtaining satisfactory thermal performance. The fact of using a controlled switch also means that a small-sized transformer can be used. For given space constraints and for an actuator provided with a radio-wave receiver, it has also been observed that there is a trade-off in the choice of the control frequency of the switch to minimize the overall cost of the solution.

BRIEF DESCRIPTION OF THE DRAWINGS

The appended drawing represents, by way of example, an embodiment of the actuator according to the invention.

FIG. 1 is a diagrammatic view of an actuator according to the invention; and FIG. 2 is a graph representing, on the y axis, the costs of producing the actuator according to the invention according to the ratio of the control frequency of the switch in the converter and, on the x axis, the operating frequency of the radio-wave receiver.

In representative power and space conditions, the radio-wave transmission frequency should be greater than 4500 times the control frequency of the switch.

The choice of a switch control frequency equal to twice the frequency of the mains supply, and synchronized on the latter, provides for the best performance/cost trade-off.

Such a choice is compatible with the use of a conventional transformer, with plates and no ferrite core, this transformer being significantly smaller than that which would be required in the case of a conventional power supply provided with a transformer and a rectifier.

DETAILED DESCRIPTION

An actuator 10 represented in FIG. 1 takes from the AC electrical mains supply a power P1 to convert it into mechanical power P2 on an output shaft. The mechanical power P2 output is substantially lower than the electrical power P1 drawn at the input, because of losses within the actuator.

A step-down AC/DC converter 3, or power supply unit (referred to interchangeably herein) provides the required conversion from an AC low voltage into a DC extra low voltage. Naturally, its output voltage need not necessarily be strictly constant and major fluctuations associated with the frequency of the mains supply may even be accepted (for example, a ripple factor of 10 to 30%). For motor noise issues, there is nevertheless an interest in reducing this ripple.

This voltage is transmitted to an extra low voltage DC motor 5 via a control board 4 comprising in particular a radio-wave receiver 41. As in the above-mentioned prior art, the radio-wave receiver receives the control signals sent by a remote control, not represented but widely known to those skilled in the art. The receiver 41 is tuned to operate at a frequency denoted F0. Its antenna can be external or internal to the enclosure 7 and/or benefit from coupling with the power supply line.

Naturally, the element 41 can also be a transceiver for sending command acknowledgement or successful command execution signals or even operating fault signals.

The control board 4 also contains a processing logic unit 42, for example a microcontroller, so as to control the electrical power supply of the motor on the basis of the commands received. A motor current sensor, not represented, is used for example to analyze the motor torque. It can be linked to a speed or position sensor linked to the motor and/or to the output shaft of a reduction gear 6. These elements are known to those skilled in the art.

Advantageously, the control board 4 and the converter 3 are mounted on one and the same printed circuit. The power that supplies the control board is normally drawn from the output voltage of the converter 3, but it may also be advantageous to use a separate power supply circuit, at least to supply the radio-wave receiver when the latter is in the "standby" state.

The DC motor 5 is powered from the converter 3 under the control of the board 4. It is the consumption of the latter that mainly set the size of the converter. The reduction gear that follows it in the kinematic chain generally comprises at least two reduction stages.

The above assembly of elements is mechanically inserted into a tubular or parallelepipedal enclosure 7 made of steel, plastic material or composite material. The openings required for entry of the electrical power supply cable and the output shaft are provided with sealing means for preventing dust and splashed water from entering into the enclosure.

This assembly 10 is itself inserted into an element longer than the winding tube of a blind or a shutter, or even the casing of a venetian blind. This element is normally made of steel.

For the powers concerned (measured in tens of watts) the required space is approximately 20 or so cubic centimeters in cylindrical form, typically having a diameter of between 20 and 40 mm. In these conditions, a power supply unit comprising only passive or unidirectional elements causes unacceptable overheating, unless the operation times are considerably limited. It will therefore be advantageously replaced by a switched power supply unit 3, which includes at least one switch 3*a*, controlled at a frequency F1. A small transformer can be added to the converter assembly.

In other fields, and also in the field of actuators for solar protection means, such power supplies are known to those skilled in the art, with different topologies. For example, the applicant markets a switched-mode power supply unit for powering, from the mains supply, a plurality of tubular actuators operating at a DC voltage of 24 volts.

It is in particular known that the higher the frequency F1, the smaller the volume of the power supply for a given power. Frequencies of 80 kHz, even higher than 100 kHz, are, consequently, commonly used.

The harmonics induced by the switching of the switch 3*a*(or the switches) are incompatible with the presence of a radio-wave receiver 41 within the actuator and this effect increases with the ratio F1/F0.

Being enclosed in a tube or metal casing serving as a screen and not being linked to an external, large-sized antenna, the receiver used must have a very high sensitivity. It is therefore very vulnerable to radiated interference.

When confronted with a problem of cohabitation between a frequency-controlled switched power supply and between a radio-wave receiver, it is resolved either by component shielding and spacing techniques, or by filtering techniques, or by use of a particular type of switching mode enabling the power supply to operate in resonant or quasi-resonant mode. More often than not, a combination of these methods is used. Patents U.S. Pat. No. 5,642,274, U.S. Pat. No. 5,528,481 and U.S. Pat. No. 4,688,614 disclose examples of these techniques. It should be noted that, in the case of a television for example, there is sufficient space to separate the critical assemblies and so minimize coupling effects.

Without using additional and costly shielding and filtering elements, it would seem out of the question in principle for a person skilled in the art to position in the immediate vicinity, and even more so on one and the same printed circuit board, a frequency-controlled switched power supply and a high sensitivity radio-wave receiver.

The invention does, however show that this is possible at an economically sustainable cost and even doing without a power supply operating in resonant mode. This possibility relies on compliance with particular frequency conditions.

FIG. 2 diagrammatically represents an asymptotic diagram of the costs, in logarithmic scale, versus the ratio of the frequencies F1/F0, for a given motor power. The costs are expressed in octaves (doubling for each interval) and the ratios of the frequencies in decades.

The curve 22 represents the overall functional costs, in other words, the costs needed to produce the converter 3 and the control board 4 provided with the receiver 41 in a given space. In this example, the space cross section is fixed and the length is free.

Given the regulations, the frequency of the radio-waves in this type of application can be situated at approximately 100 kHz, and/or on the frequencies used for RFID-type proximity communications or can even be greater than a megahertz (for example, 27, 433, 868 or 2400 MHz). Without the benefit of the mass production effects associated with particular applications, the costs needed to produce the radio-wave receiver are relatively unaffected by the frequency. For example, AM detection of 100 kHz-type frequencies is easier than FM detection at 433 MHz. The larger dimension of the components in the first case is offset by their smaller number.

In a first approximation, the cost of the overall functional components therefore depends far more on the frequency F1 of the converter than on the frequency F0 of the receiver.

In practice, except in the particular case where the switching frequency F1 of the power supply unit is equal to the mains supply frequency or twice the latter, increasing the frequency F1 means that the transformer of the power supply unit and the storage capacitor limiting ripple on the output voltage can be miniaturized. This miniaturization is indeed reflected in the use of slightly more expensive components (ferrite core of transformers, switching transistor used as switch), but this cost is more than offset by the reduction in the space volume and the improvement in thermal performance which are directly linked to efficiency. The overall functional cost (represented by the curve 22) therefore decreases when the frequency F1 increases and therefore when the ratio F1/F0 increases.

Conversely, the use of a switched power supply unit controlled at the frequency of the mains supply or at a low frequency that is a multiple of the mains supply frequency is reflected in a significant drop in the cost of production of the converter and therefore the overall functional cost, since it allows the use of a transformer with a core consisting of conventional plates and not of ferrite. Such a power supply is described for example in patent U.S. Pat. No. 5,818,708. This fall in cost is particularly great given that, for low frequencies, a ferrite core transformer presents large dimensions.

The filtering cost is represented by the curve 21. Filtering is understood here to mean any shielding or attenuation element enabling the assembly to remain functional, once the elements are positioned in the immediate vicinity of each other in the enclosure 7, and enabling the standards to be observed. The filtering required by the motor is also taken into account. Filtering is applied to the radiated and conducted interference modes.

Apart from the low switching frequency values of the power supply F1, this curve increases with the ratio of the frequencies F1/F0: the higher this ratio, the more the converter affects the receiver. The more the ratio increases, the more this filtering cost is due to the cohabitation of the elements.

For low values of F1, in particular equal to or multiples of the mains supply frequency, the converter operates in a mode that strongly affects conducted mode interference. The result is an additional filtering cost, dictated by regulatory requirements.

The overall cost is represented by the curve 23, sum of the functional costs and the filtering costs.

It will be noted that there are two areas of minimum overall cost: one Z1 corresponding to a very low value of the ratio F1/F2, the other Z2 situated either side of a value approximately equal to $7\ 10^{-5}$.

The area Z1 corresponds to the particular case already mentioned of a switch control frequency equal to or double that of the AC power supply network.

In the second area Z2, every effort is therefore made to satisfy the optimum condition on the ratio F1/F0. As an example, a control frequency equal to 30 kHz corresponds to the optimum for a frequency of 429 MHz.

It is, however, clear that this optimum allows a slight increase in cost, to favor a smaller space. An appropriate extent corresponds to a decade centered on this value.

The chosen ratio can therefore vary within a range between $7/\sqrt{10}\ 10^{-5}$ (approximately $2.2\ 10^{-5}$) and $7/\sqrt{10}\ 10^{-5}$ (approximately $2.2\ 10^{-4}$), while complying with the teaching of the invention relative to the area Z2. To express this the other way round, the limits of this ratio consist on the one hand in situating the frequency F0 as being at least greater than 4500 times the frequency F1; and, on the other hand, in taking a value F0 less than 45000 times the frequency F1.

If the teachings of the invention are observed, it is consequently not incompatible to use a converter with frequency controlled switch and a radio-wave receiver within a confined space involving strong interaction of the elements, nor even to locate these functions on one and the same printed circuit board.

Furthermore, the invention then allows, at lower cost, for the use of a receiver offering high sensitivity, and the antenna of which is disposed inside the enclosure of the actuator.

Specific embodiments of an electrical actuator having a direct current motor according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. An electrical actuator configured to operate a closing, darkening or solar protection element and operatively coupled to a mains input voltage source having a mains frequency, the actuator in a common enclosure comprising:

- a direct current motor;
- a control board configured to control the motor;
- an AC/DC voltage converter configured to convert and lower the input voltage source and having at least one switch operating at a switching frequency (F1);
- a radio frequency (RF) receiver configured to receive external signals at a receiver frequency (F0); and wherein the switching frequency is less than twice the mains frequency and/or the ratio of the switching frequency (F1) to the receiver frequency (F0) ranges between 2.2×10ˆ−5 and 2.2×10ˆ−4 so that energy generated by the AC/DC voltage converter does not interfere with the RF receiver.

2. The electrical actuator as claimed in claim 1, wherein the AC/DC voltage converter comprises a voltage transformer.

3. The electrical actuator as claimed in claim 1, wherein the AC/DC voltage converter and the control board are mounted on the same printed circuit.

4. The electrical actuator as claimed in claim 1, wherein the radio-wave receiver of the control board is provided with an antenna located inside the enclosure of the actuator.

5. The electrical actuator as claimed in claim 2, wherein the AC/DC voltage converter and the control board are mounted on the same printed circuit.

6. The electrical actuator as claimed in claim 2, wherein the radio-wave receiver of the control board is provided with an antenna located inside the enclosure of the actuator.

7. The electrical actuator as claimed in claim 3, wherein the radio-wave receiver of the control board is provided with an antenna located inside the enclosure of the actuator.

8. The electrical actuator as claimed in claim 5, wherein the radio-wave receiver of the control board is provided with an antenna located inside the enclosure of the actuator.

* * * * *